United States Patent [19]

Maruno et al.

[11] Patent Number: 5,296,919
[45] Date of Patent: Mar. 22, 1994

[54] IMAGE PROCESSING APPARATUS AND METHOD FOR PERFORMING NONLINEAR GAMMA CORRECTIONS

[75] Inventors: Susumu Maruno, Osaka; Shigeo Sakaue, Moriguchi; Haruo Yamashita, Osaka; Hiroshi Yamamoto, Katano, all of Japan

[73] Assignee: Matsushita Electric Industrial Co., Ltd., Osaka, Japan

[21] Appl. No.: 938,419

[22] Filed: Aug. 31, 1992

[30] Foreign Application Priority Data

Aug. 30, 1991 [JP] Japan .................................. 3-219538

[51] Int. Cl.⁵ .............................................. H04N 9/69
[52] U.S. Cl. ...................................... 348/675; 348/687
[58] Field of Search .......................... 358/32, 164, 168; H04N 5/20, 5/202, 9/69

[56] References Cited

U.S. PATENT DOCUMENTS 4,667,228  5/1987  Kawamura .............................. 358/32
4,931,864  6/1990  Kawamura .............................. 358/32

FOREIGN PATENT DOCUMENTS

0409206A2  1/1991  European Pat. Off. .
880225323  12/1990  Japan .

OTHER PUBLICATIONS

Susumu Maruno, Multi-Functional Layered Network Using Quantizer Neurons, Nov. 1990, Central Reserach Laboratories Matsushita Elec. Ind. Co., Ltd. pp. 202-209.

A. Saito et al., "Optimum Contrast Enhancement Using Fuzzy Sets", *Systems and Computers in Japan*, vol. 22, No. 11, at pp. 52-60 (Dec. 1991).

K. S. Ray, "Image Contrast Enhancement on the Basis of Human Visual Nonlinearity", *Proceedings of the 1984 IEEE International Conference on Systems, Man and Cybernetics*, at pp. 382-387 (Oct. 1984).

R. P. Lippmann, "An Introduction to Computing with Neural Nets", *IEEE ASSP Magazine*, at pp. 4-22 (Apr. 1987).

*Primary Examiner*—James J. Groody
*Assistant Examiner*—Sherrie Hsia
*Attorney, Agent, or Firm*—Ratner & Prestia

[57] ABSTRACT

An image processing apparatus for performing nonlinear gamma corrections to image signals includes an image signal sampling unit for sampling plural kinds of picture information from the image signals of one picture frame, a nonlinear gamma correction unit for applying a nonlinear correction to the gamma of the image signals by use of nonlinear gamma curves, and a learning type gamma selector unit wherein a nonlinear relation between the picture information of the image signals sampled by the image signal sampling unit and the nonlinear gamma curves for correction is established by learning and then the picture information is judged according to the results of the learning to select a nonlinear gamma curve to be used for correction.

15 Claims, 7 Drawing Sheets

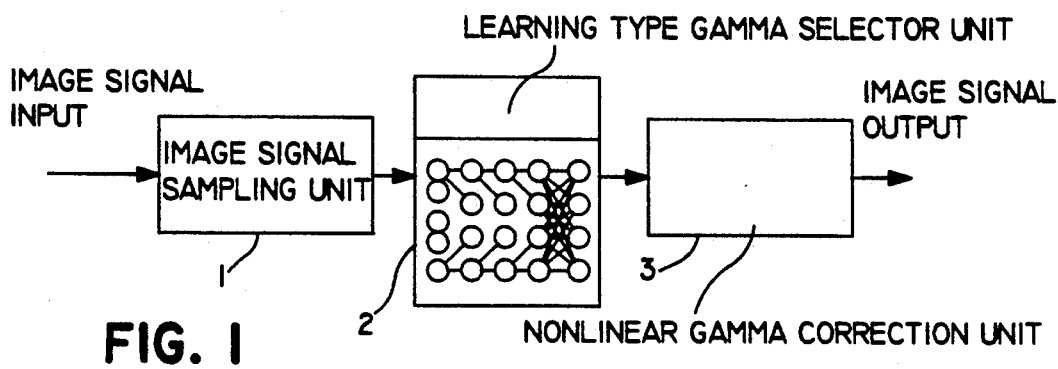

| MAX. BR.1<br>MED. BR.1<br>MIN. BR.1 | MAX. BR.2<br>MED. BR.2<br>MIN. BR.2 | MAX. BR.3<br>MED. BR.3<br>MIN. BR.3 | MAX. BR.4<br>MED. BR.4<br>MIN. BR.4 |
|---|---|---|---|
| MAX. BR.5<br>MED. BR.5<br>MIN. BR.5 | MAX. BR.6<br>MED. BR.6<br>MIN. BR.6 | MAX. BR.7<br>MED. BR.7<br>MIN. BR.7 | MAX. BR.8<br>MED. BR.8<br>MIN. BR.8 |
| MAX. BR.9<br>MED. BR.9<br>MIN. BR.9 | MAX. BR.10<br>MED. BR.10<br>MIN. BR.10 | MAX. BR.11<br>MED. BR.11<br>MIN. BR.11 | MAX. BR.12<br>MED. BR.12<br>MIN. BR.12 |
| MAX. BR.13<br>MED. BR.13<br>MIN. BR.13 | MAX. BR.14<br>MED. BR.14<br>MIN. BR.14 | MAX. BR.15<br>MED. BR.15<br>MIN. BR.15 | MAX. BR.16<br>MED. BR.16<br>MIN. BR.16 |

NOTE: MAX. BR.------MAXIMUM BRIGHTNESS
MED. BR.------MED. BRIGHTNESS
MIN. BR.------MINIMUM BRIGHTNESS

ONE PICTURE FRAME

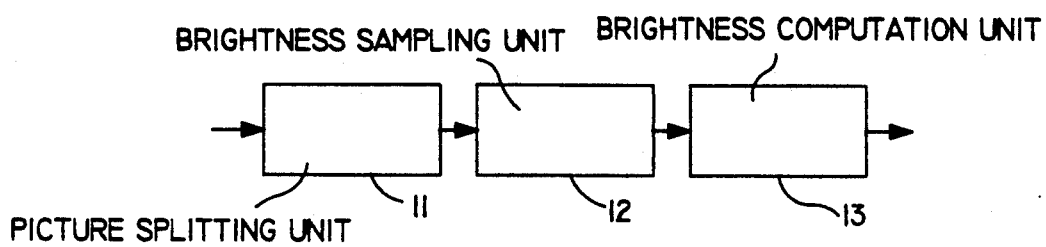

FIG. 4

GAMMA CURVES 1-16

INPUT

MAXIMUM AVAILABLE BRIGHTNESS

MAXIMUM BRIGHTNESS AT IMAGE'S CENTRAL AREA

IMAGE PROCESSING APPARATUS AND METHOD FOR PERFORMING NONLINEAR GAMMA CORRECTIONS

BACKGROUND OF THE INVENTION

This invention relates to an image processing apparatus, wherein pictures are processed in accordance with the condition of image signals, particularly to the ones which are incorporated with a function of image's gamma correction.

The conventional method of making gamma corrections and controlling brightness is to control the gradient of a gamma function which is usually linear so as to make the signal upper limit value coincide with the highest possible brightness according to the brightness in image's central area. This method is employed in an automatic iris of a video camera. As illustrated in FIG. 15(A), the gradient of a gamma function is controlled by changing the light quantity passing through a controlled opening of the iris and the maximum brightness in image's central area is made to coincide with the maximum available output of the camera so that the image signals in image's central area are well within the dynamic range of the camera.

However, when the aforementioned method is used in taking pictures of a shaded object standing with its back against a bright background, the gradient of gamma function is adjusted by making the maximum brightness in image's central area coincide with the maximum possible output signal of the camera by opening the camera iris larger than usual and, as illustrated in FIG. 15(B), the pictures of the bright background turn out white all over due to the saturation of the output signal of the camera.

This invention is intended for solving the foregoing problem by providing an image processing apparatus wherein the best possible gamma correction is made against whatever picture objects.

SUMMARY OF THE INVENTION

For achieving the foregoing object, an image processing apparatus of this invention comprises an image signal sampling unit wherein plural kinds of information are sampled from the image signals of one picture frame, a nonlinear gamma correction unit wherein the gamma of said image signals is corrected so as to have a nonlinearity according to a nonlinear gamma curve, and a learning type gamma selector unit wherein a nonlinear relation is established by learning between the picture information of said image signals sampled through the image signal sampling unit and said nonlinear gamma curve to be used for correction, and said picture information is evaluated according to the results of said learning, and also a nonlinear gamma curve to be used for correction is selected.

Further, said learning type gamma selector unit comprises a combination of plural recognition units, each of which is composed of a signal input unit for inputting the picture information of image signals, a quantitizer for quantitizing the picture information according to the input signals from said signal input unit, a single or multiple number of channel input terminal, thus forming a single or multiple number of channel output terminal, and a single or multiple number of tree branch structure, each of which forms networks consisting of multiple layers.

In the image processing apparatus thus structured, when the image signals for one picture frame are inputted to the image signal sampling unit, plural kinds of the picture information contained in the total image signals of one picture frame are sampled, processed by computation, and outputted to the learning type gamma selector unit. A relation between the picture information of various image signal conditions and the nonlinear gamma curves to be used for gamma correction is established by learning in advance by the learning type gamma selector unit, and according to the results of the learning the sampled image signals are judged and a nonlinear gamma curve to be used for correction is selected and then the results thereof are sent out to the nonlinear gamma correction unit. In the nonlinear gamma correction unit, the original image signals are gamma corrected by the nonlinear gamma correction curve selected by the learning type gamma selector unit and the resultant corrected image signals are outputted.

In addition, in the learning type gamma selector unit comprising networks of multiple layers, each of which has a single or multiple number of tree branch structure formed by combining plural recognition units, the number of the tree branch structure corresponds to that of the plural kinds of the picture information. The image signals are fed by each layer into the signal input terminals of recognition units that are situated on each layer of the tree branch structure corresponding to the signal levels sampled by the image signal sampling unit. The recognition unit situated on the output layer of the networks is composed of a summation computing unit wherein the total sum of the input signals is calculated and a threshold processing unit wherein the total sum of the input signals is threshold processed and the results thereof are outputted to the nonlinear gamma correction unit. The recognition unit of the foregoing output layer is interlinked with that of the front layer of the output layer so that a learning in advance is made possible by having a signal of selecting a nonlinear gamma curve to be used for correction inputted as a teaching signal to the signal inputting unit of said recognition unit situated on the front layer of the output layer.

In the learning type gamma selector unit, a nonlinear gamma curve to be used for gamma correction is selected after a judgment made according to the detailed picture information pertaining to the pictures in its totality. Thus, compared with the conventional method of gamma correction made according to the brightness information obtained from a part of the picture, a more flexible and accurate judgment is provided promptly in making gamma corrections and also excellent corrected pictures having a wide dynamic range are obtainable.

BRIEF DESCRIPTION OF THE DRAWINGS

FIG. 1 is a block diagram of a first example of the embodiments of this invention of an image processing apparatus.

FIG. 2 is a pattern chart showing how signals are sampled by an image signal sampling unit of an image processing apparatus of this invention.

FIG. 4 is a block diagram of an image signal sampling unit of an example of the embodiments of this invention of an image processing apparatus.

Some keys to diagram symbols:
1 Image Signal Sampling Unit
2 Learning Type Gamma Selector Unit
3 Nonlinear Gamma Correction Unit

DETAILED DESCRIPTION OF THE INVENTION

FIG. 1 is a block diagram showing an embodiment of this invention for an image processing apparatus. When image signals of one picture frame are inputted to an image signal sampling unit 1, pieces of picture information of the entire image signals for one picture frame are sampled at the image signal sampling unit 1 and outputted to a learning type gamma selector unit 2. A relation between the picture signals under various condition and the nonlinear gamma curves to be used for gamma correction is established by learning in advance by the learning type gamma selector unit 2 and, according to the learning results thereof, the image signals of the entire picture frame are judged and nonlinear gamma curves (gamma curve 1–gamma curve 16) are selected by the learning type gamma selector unit 2 and then the results thereof are transmitted to a nonlinear gamma correction unit 3.

Figure 13:
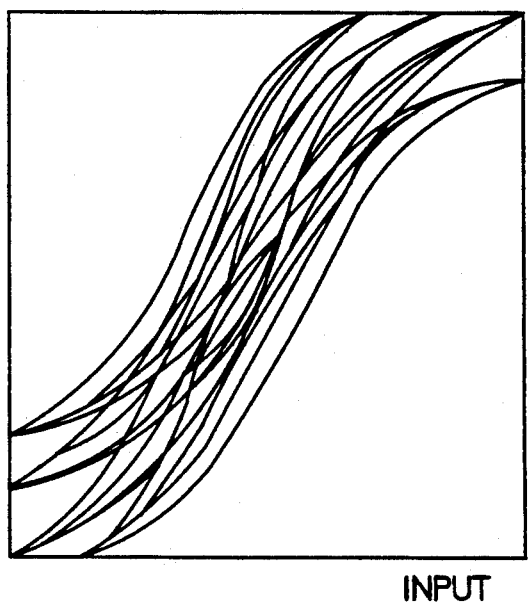
FIG. 13 is a typical graphical representation of nonlinear gamma correction curves as used with a gamma correction unit of an image processing apparatus of this invention.
Figure 14:
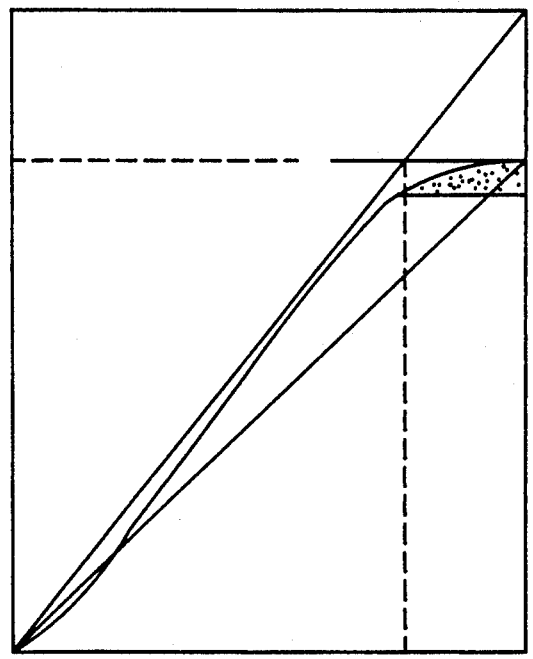
FIG. 14 is a graphical illustration to show how gamma corrections are made according to this invention.
Figure 15A:
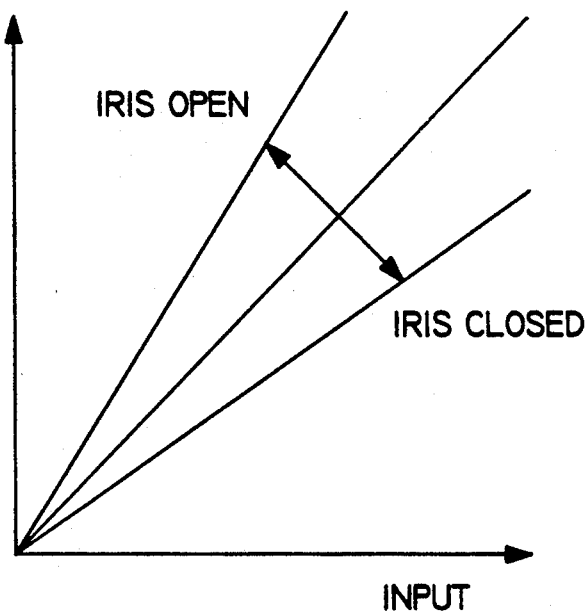
FIGS. 15(a) and 15(b) are graphical illustrations to show how gamma corrections are made by a conventional method.
Figure 15B:
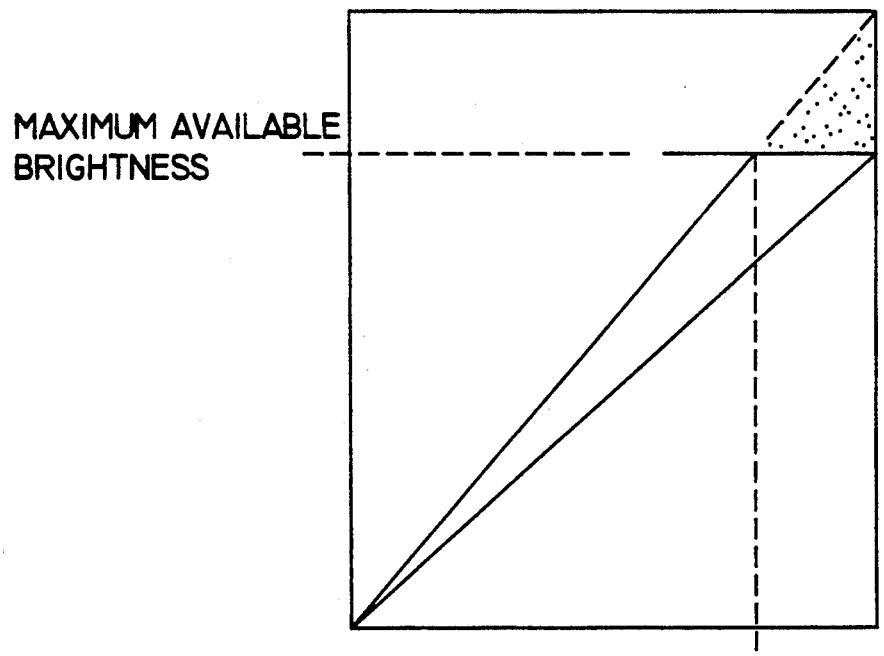

According to the nonlinear gamma correction, curves selected by the learning type gamma selector unit 2, the original picture signals are gamma corrected by the nonlinear gamma correction unit 3 and the corrected image signals are outputted. Sigmoid curves of 16 different kinds as examples of nonlinear gamma curves to be used for correction are shown in FIG. 13. These curves are stored by learning in the learning type gamma selector unit 2 in advance so that the most suitable nonlinear gamma curves can be selected from these curves according to the picture conditions. When a picture of a shaded object located at a central area of the picture frame with its back facing a bright background is to be taken and then processed by a image processing apparatus of this invention, how picture corrections are conducted is illustrated in FIG. 14. Since the brightness of the picture is corrected by a nonlinear gamma correction curve selected by the learning type gamma selector unit 2, the portion corresponding to the bright background is not saturated as shown in FIG. 14 with the resultant maintenance of an excellent color tone.

Figure 3:
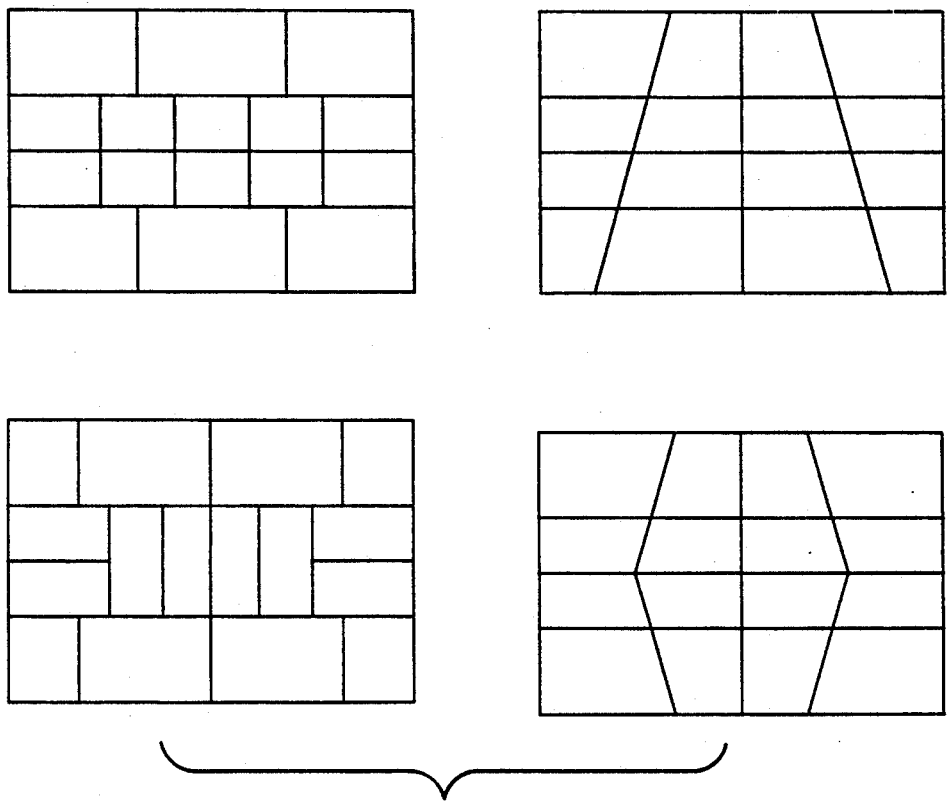
FIG. 3 illustrates some patterns whereby signals are sampled by an image signal sampling unit of an image processing apparatus of this invention.

FIG. 4 is a block diagram showing an embodiment of the image signal sampling unit 1. When the image signals of one picture frame are inputted to a picture splitting unit 11, the picture frame is splitted, as shown in FIG. 2, into 16 blocks, for example. Regarding the splitting of the picture frame, there are many ways as shown in FIG. 3. Brightness signals of each split block are sampled by a brightness sampling unit 12. The maximum, the medium and the minimum brightness levels, 1–16 for example, for each respective split block are computed by a brightness computation unit and the results thereof are outputted. In other words, the positional signals corresponding to the split blocks and the brightness signals corresponding to the brightness levels for each split block are utilized as the information of the image signals.

Figure 6:
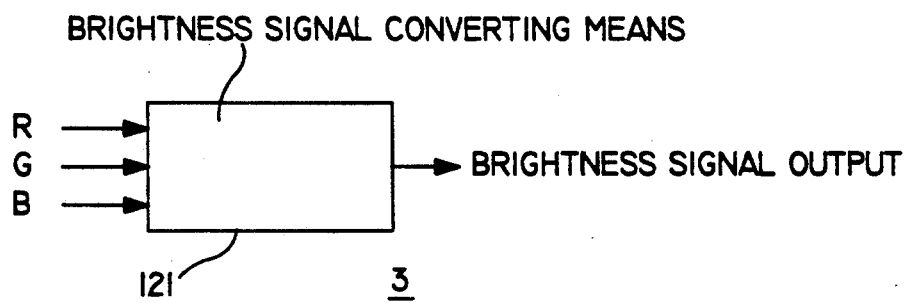
FIG. 6 is a block diagram of a nonlinear gamma correction unit of an example of the embodiments of this invention of an image processing apparatus.

FIG. 6 is a block diagram showing an embodiment of a brightness signal sampling unit 12. Item 121 is a brightness signal converting means for composing a brightness signal Y from the R, G and B signals of a split picture block. Its characteristics are different according to chromaticity of each of the primary colors R, G and B. In the case of television signals for the NTSC system, a structure having the following conversion characteristics can be employed:

$$Y = 0.3*R + 0.59*G + 0.11*B \tag{1}$$

where $0 \leq R \leq 1$, $0 \leq G \leq 1$, $0 \leq B \leq 1$.

Figure 7:
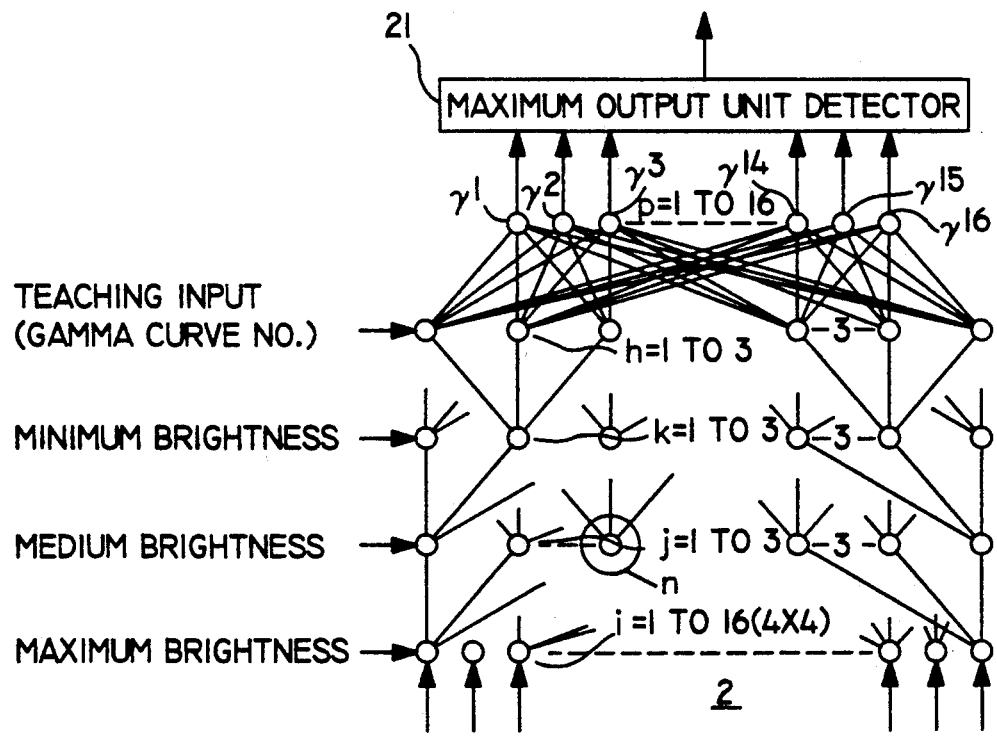
FIG. 7 is a schematic illustration of a learning type gamma selector unit of an example of the embodiments of this invention of an image processing apparatus.

FIG. 7 is a schematic illustration of an embodiment of a learning type gamma selector unit 2. The maximum, the medium and the minimum brightness levels of each of the 16 different picture blocks as sampled by the image signal sampling unit 1 are judged and 16 different nonlinear gamma curves are selected at this learning type gamma selector unit. There are 16 structural units of the tree branch structure formed by combining a multiple number of the recognition unit n with one structural unit of the tree branch structure forming a network comprising 5 layers. The 16 recognition units 1–16 are situated on the fifth layer of output layer. These recognition units 1–16 of the fifth layer are interlinked with each of the output terminals situated on the fourth layer of each of the tree branch structures respectively. A recognition unit n outputting a maximum output is detected by a maximum output unit detector 21 and its unit number is outputted.

Figure 9:
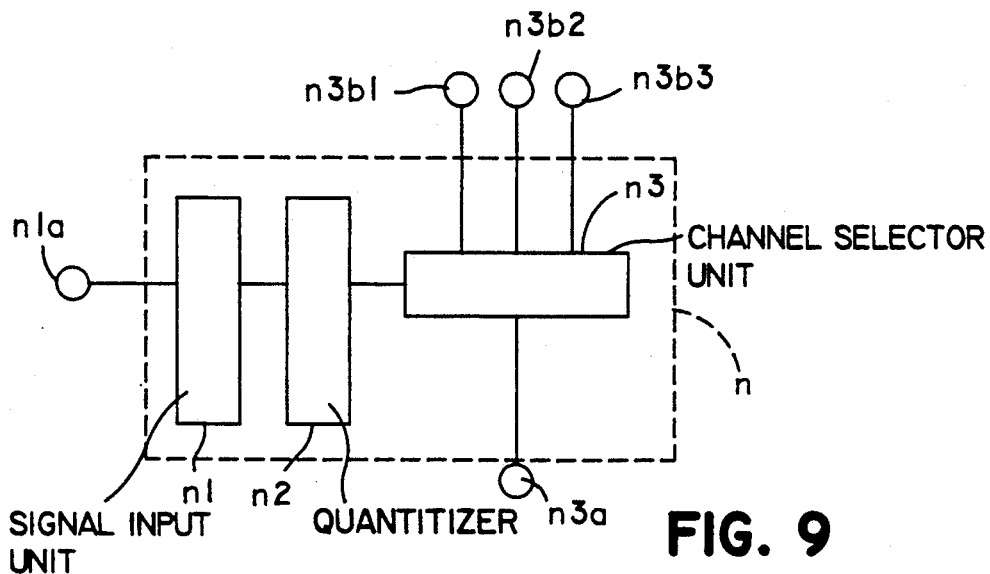
FIG. 9 is a block diagram of a first example of a recognition unit as used in a learning type gamma selector unit of an image processing apparatus of this invention.

FIG. 9 is a block diagram showing an embodiment of the recognition units that are used in the first layer through the third layer of the learning type gamma selector unit 2 of this invention. Item n1 is a signal input unit wherein image signals inputted through a signal input terminal n1a are inputted to a quantizer n2. The image signals inputted to the quantizer n2 are quantized and the quantized values are inputted to a channel selector unit n3. Item n3a is a channel input terminal and items n3b1, n3b2, and n3b3 are channel output terminals and all of these terminals are interlinked when these terminals are combined with recognition units to complete a network consisting of tree branch structures. The channel selector unit n3 is structured in such a way as the interlinkage between the channel input terminal n3a and the channel output terminals of n3b1, n3b2, and n3b3 are varied according to the values inputted from the quantizer n2.

Figure 10:
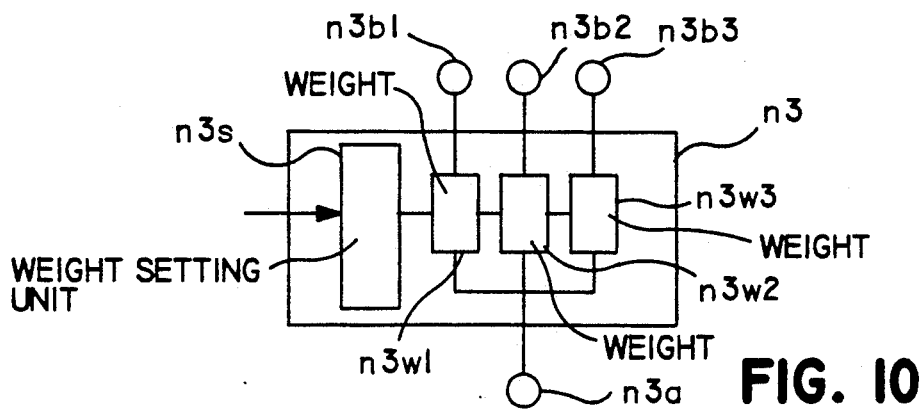
FIG. 10 is a block diagram of a second example of a recognition unit as used in a learning type gamma selector unit of an image processing apparatus of this invention.

FIG. 10 is a block diagram of an embodiment of the channel selector unit n3. The channel selector unit n3 comprises a channel input terminal n3a, three channel output terminals of n3b1, n3b2, and n3b3, a weight setting unit n3s and weights of n3w1, n3w2, and n3w3. The weights of n3w1, n3w2, and n3w3 are the weight ratios, by which the signals inputted through the channel input terminal n3a are multiplied and the results thereof are outputted through the channel output terminals of n3b1, n3b2, and n3b3. The magnitudes of the weights of n3w1, n3w2, and n3w3 are set by the weight setting unit n3s so that the interlinkage between the channel output and input terminals, both appointed by the output values of the quantizer.

Figure 11:
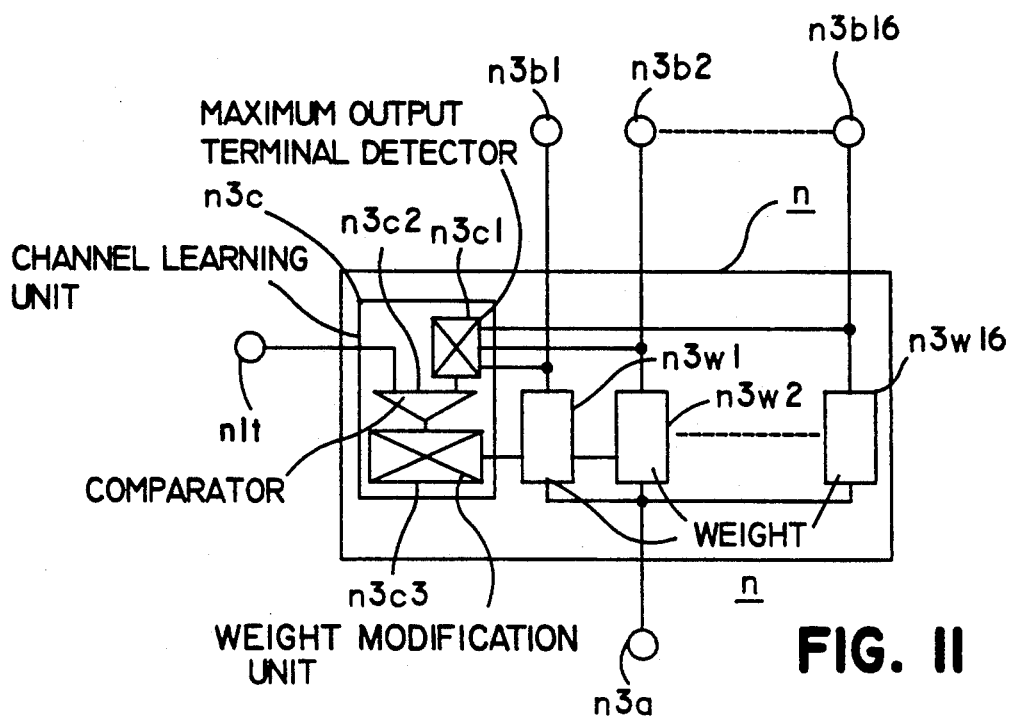
FIG. 11 is a block diagram of a third example of a recognition unit as used in a learning type gamma selector unit of an image processing apparatus of this invention.

FIG. 11 is a block diagram showing an embodiment of the recognition unit as used in the fourth layer (the front layer of the output layer) of a learning type gamma selector unit of this invention. Item n1t is a teaching signal input terminal wherein the number of a nonlinear gamma curve to be used for correction during the learning process, namely, the number of the recognition unit situated on the fifth layer is inputted. Item n3a is a channel input terminal and items n3b1 through n3b16 are channel output terminals. The weights of n3w1 through n3w16 are the weight ratios, by which the signals inputted through the channel input terminal n3a are multiplied and the results thereof are outputted to the channel output terminals of n3b1 through n3b16. Item n3c is a channel learning unit wherein the interlinkage between the channel output terminals and the channel input terminals, both appointed by the teaching signal input values, is varied during the learning process.

During the recognition process, no signals are inputted to the teaching signal input terminal n1t and the weights of n3w1 through n3w16 are maintained at the weight conditions of after learning. Thus, the channel signals inputted from the channel terminals are weighted and then outputted to the channel output terminals n3b1 through n3b16. The channel learning unit n3c comprises a maximum output terminal detector n3c1 for detecting a channel output terminal which has the maximum output, a comparator n3c2 wherein the channel output terminal number detected by the foregoing maximum output terminal detector is compared with the channel numbers appointed by teaching input signals, and a weight application unit n3c3 for modifying linkage strength, namely weight, existent between the foregoing channel input terminals of the channel input unit and the channel output terminals of the channel output unit which are appointed by the quantizer n2.

The comparator n3c2 has a constitution wherein the channel output terminal from the maximum output terminal detector n3c1 is compared with the numbers of the channel output terminals appointed by teaching input signals and in case the aforementioned two numbers are not the same, then 0 is outputted and in case the two numbers are the same, 1 is outputted. The weight application unit n3c3 has a constitution wherein the linkage between the aforementioned channel input terminals of the channel input unit and the channel output terminals appointed by the output from the quantizer n2 is intensified in case the output from the comparator n3c2 is 0.

Figure 12:
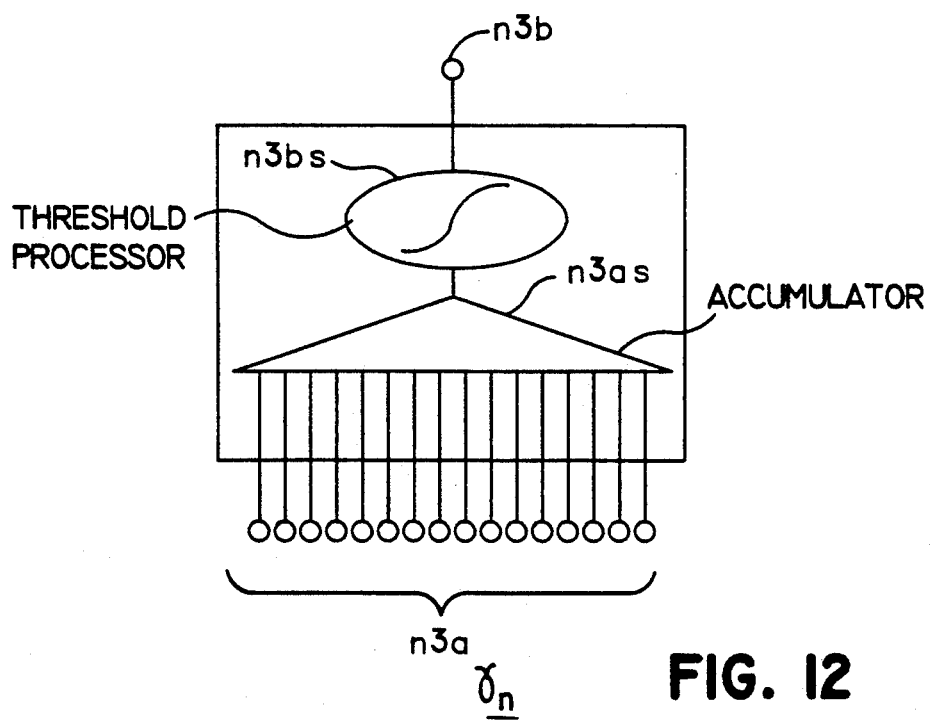
FIG. 12 is a block diagram of a fourth example of a recognition unit as used in a learning type gamma selector unit of an image processing apparatus of this invention.

FIG. 12 shows a typical recognition unit used, for example, as the recognition units r1 through r16 that compose the fifth layer. The recognition unit comprises an accumulation n3as wherein the input signals from the plural channel input terminals n3a are accumulated, and a threshold processor n3bs wherein the output signal from the accumulator n3as is threshold processed and the result thereof is outputted to the output terminal n3b. As the functions for threshold processing, a sigmoid function, a step function and the like can be used.

In the next, a learning process and operation of the learning type gamma selector unit 2 of FIG. 7 is explained. First, a digit number of 1 is provided as a channel signal First, a digit number of 1 is provided as a channel signal situated on the first layer of each tree branch structure that corresponds to each of the picture blocks respectively. Also, the maximum, the medium and the minimum brightness signals for each of the 16 picture blocks sampled by the image signal sampling unit 1 are inputted to the signal input terminal n1a connected to the quantized n2 of the recognition unit n2 situated on the first layer through the third layer of each tree branch structure corresponding to each of the picture blocks respectively. The maximum, the medium and the minimum brightness signals of each picture block are quantized by the quantizer n2 of the recognition unit n situated on the first layer through the third layer of each tree branch structure and, according to the resultant quantized values, the weights n3w1 through n3w3 of linkage with the recognition units situated on the upper layer are established and channel output signals are transmitted to recognition units of the upper layer and then ultimately channels signals are inputted to the channel signal input terminal n3a of the fourth layer recognition unit. At this time, the channel signals from the channel input terminal n3a are weighted by the weights n3w1 through n3w16 of the recognition units situated on the fourth layer and the resultant weighted channel signals are outputted to the channel output terminals n3b1 through n3b16.

The channel output terminal which outputs the maximum output is detected by the maximum output terminal detector n3c1 and the number of the channel output terminal thus detected is inputted to the comparator n3c2.

Also, a signal representing the number of the nonlinear gamma curve to be used for correction, one out of gamma curve 1 through gamma curve 16 for example, is inputted to the teaching input terminal n1t. In the comparator n3c2, the channel output terminal number detected by the maximum output terminal detector n3c1 is compared with the number of the channel output terminal appointed by the teaching input signal, and in case the both numbers are not the same, a digit number of 0 and in case the both numbers are the same, a digit number of 1 is inputted respectively to the weight application unit n3c3.

When the output from the foregoing comparator n3c2 is 0, that is, the channel output terminal number of the maximum output and that appointed by the teaching input signal are different from each other, the linkage between the foregoing channel input terminal of the channel input unit and the channel output terminal of the channel output unit appointed by the teaching input signal is intensified by the weight application unit n3c3.

As explained in the foregoing, the learning process required of the learning type gamma selector unit of the image processing apparatus of this invention comprises only inputting the maximum, the medium and the minimum brightness values for each of the 16 picture blocks sampled by the image signal sampling unit 1 to the signal input terminals of each recognition unit as carried on the first layer through the third layer of the tree branch structure corresponding to each respective picture block, establishing linkage among recognition units according to the output from the quantizer of each recognition unit, and finally in the fourth layer, changing the strength of the linkage between the channel input terminals of the recognition units and the channel output terminals appointed by teaching input values, and makes it possible to realize a very rapid learning.

Next, how nonlinear gamma curves are selected by the learning type gamma selector unit 2 as shown in FIG. 7 is explained. By the same process as in the learning process, a digit of 1 is provided as a channel signal to the channel input terminal n3a of the recognition units situated on the first layer of each of the tree branch structures. Also, the maximum, the medium and the minimum brightness signals for each of the 16 picture blocks sampled by the image sampling unit 1 are inputted to the signal input terminal n1a of the quantizers as carried by the recognition units situated on the first through third layers of each tree branch structure corresponding to each picture block. The maximum, the medium and the minimum brightness signals of each picture block are quantized by the quantizers n2 of the recognition units as carried in the first through third layers of each tree branch structure and, according to the quantized values, the weights n3w1 through n3w3 of linkage with the recognition units situated on the upper layer are established and the channel output signals are transmitted to the recognition units of the upper layer and ultimately inputted to the channel signal input terminal n3a of the recognition units situated on the fourth layer. In the case of nonlinear gamma curve selection, a teaching input signal is not inputted to the teaching signal input terminal n1 of the fourth layer recognition units. Therefore, the weight condition existent during the learning process is maintained in the weights n3w1 through n3w16 of the recognition units situated on the fourth layer and the channel signals inputted through the channel input terminal n3a are, thus, weighted. The weighted channel signals are outputted from the channel output terminals n3b1 through n3b16 and then transmitted to the channel input terminal n3a of all the recognition units situated on the fifth layer.

All the channel signals inputted are accumulated at the accumulator n3as of the channel input units as carried by the units of the fifth layer and then transmitted to the threshold processing unit n3bs, wherein the signals are threshold processed and outputted to the output terminal n3b. Only when the accumulated signals exceed a certain threshold value, signals are outputted. The recognition unit outputting the highest output is detected from the recognition units 1 through 16 of the fifth layer by the maximum output unit detector and its unit number, namely, the number of the nonlinear gamma curve to be used for correction, as shown in FIG. 13, is transmitted to the nonlinear gamma correction unit 3, wherein in the original pictures are gamma corrected according to the nonlinear gamma correction curve selected by the learning type gamma selector unit 2 and the corrected pictures are outputted. Thus, the nonlinear gamma curves to be used for correction can be selected according to the maximum, the medium and the minimum brightness signals for each split picture block and the learning results.

As explained in the foregoing, the nonlinear gamma curve selection process of the learning type gamma selector unit as used in the picture processing apparatus of this invention comprises inputting the maximum, the medium and the minimum brightness signals for each of the 16 picture blocks sampled by the image signal sampling unit 1 to the signal input terminals of each recognition unit as carried by the first through the third layers of each tree branch structure corresponding to each respective picture block, establishing the way how the recognition units are interlinked one another according to the output from the quantizers of each respective recognition unit, providing weights to the channel signals inputted from the channel input terminal n3a in the fourth layer according to the weights established during the learning process, the channel signals thus weighted are outputted to the channel output terminals n3b1 through n3b16, and then finally transmitted to the channel input terminal n3a of all the recognition units situated on the fifth layer to select the nonlinear gamma curve to be used for correction. Thus, based on the learning results, a very rapid process of selecting nonlinear gamma curves can be realized.

Figure 5:
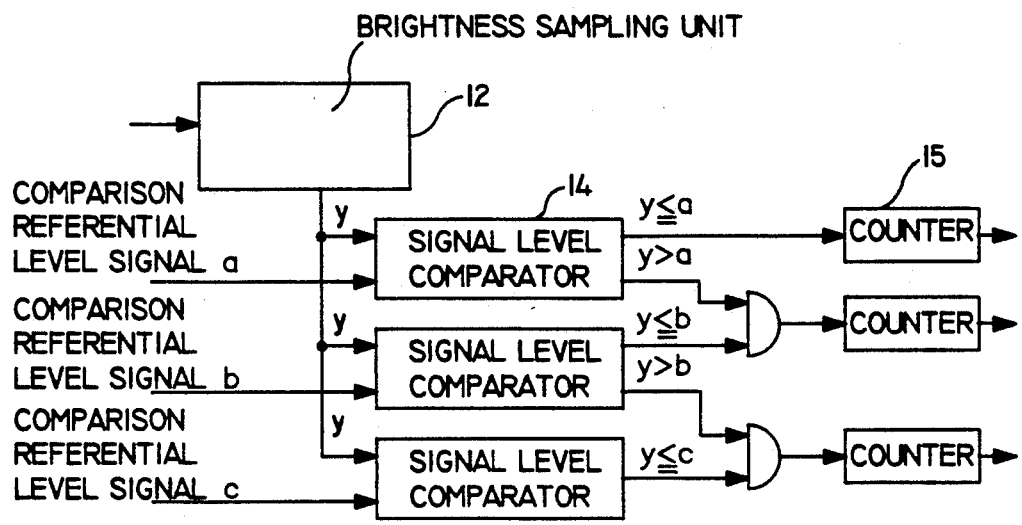
FIG. 5 is a block diagram of an image signal sampling unit of another example of the embodiments of this invention of an image processing apparatus.

FIG. 5 is a block diagram showing another embodiment of the picture signal sampling unit of this invention. When signals of one picture frame (the R, G, and B signals for example) are inputted in sequence, the brightness signal y is obtained by computation from the input signals at a brightness sampling unit 12 and outputted to signal level comparators 14. The brightness signal y is compared with each of the comparison referential level signals a, b and c, and when the brightness signal y is smaller than the comparison referential level signals, an "ON" signal is outputted to counters 15. The "ON" signals are counted by the counters 15 respectively and the frequency of the case where the brightness signals for the entire one picture frame are smaller than the respective comparison referential signals, is outputted and the results thereof are processed by computation to obtain histograms of brightness for a given number of levels (three levels of a, b and c for this embodiment) and the histograms are outputted to the learning type gamma selector unit. In other words, this is an example of the case where the frequency for various levels of brightness is used as the picture information of the picture signals.

Figure 8:
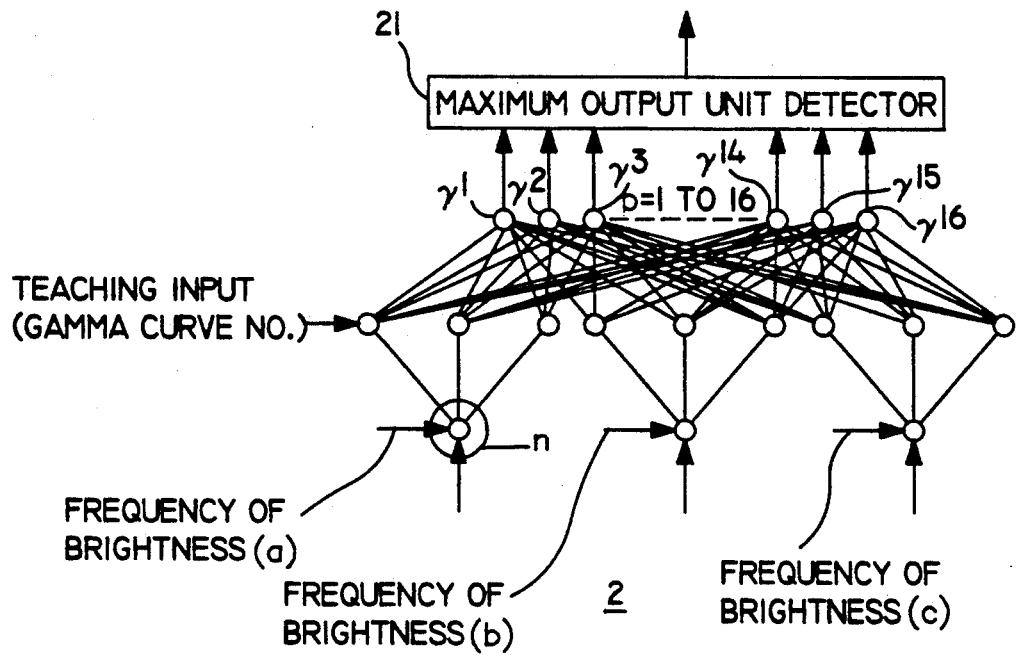
FIG. 8 is a schematic illustration of a learning type gamma selector unit of another example of the embodiments of this invention of an image processing apparatus.

FIG. 8 is a schematic illustration of a learning type gamma selector unit 2 as used in the aforementioned embodiment of this invention. The learning type gamma selector unit comprises three tree branch structures combining plural recognition units and forming networks, the "three" thereof corresponding to the signal level number of three of the brightness signal histograms sampled by the image signal sampling unit 1 as shown in FIG. 5. Each of the tree branch structures is constituted to have three layers respectively. The brightness signal frequency data sampled at the picture signal sampling unit as described in FIG. 5 are inputted to each of the recognition units of the first layer respectively and from a judgement exercised on these frequency distributions the number of a gamma correction curve to be used for correction is outputted. The same recognition units as explained in the embodiment of FIG. 7 can be used as the ones used in each respective layer. Also, the learning and recognition processes are the same as explained in the embodiment of FIG. 7.

As explained in the foregoing, according to the nonlinear gamma curve selection process as employed by the learning type gamma selector unit of the image processing apparatus of this embodiment, the picture information in the form of plural brightness level histograms sampled by the image signal sampling unit 1 is inputted to the signal input terminal of each respective recognition unit situated in the tree branch structures corresponding to the picture information, the way of interlinking the recognition units one another according to the output from the quantizer of each respective recognition unit is established, and the channel signals inputted through the channel input terminal n3a are weighted at the front layer of the output layer according to the weight established during the learning process and then outputted to the channel output terminals n3b1 through n3b16. Thus, only by transmitting channel signals to all the recognition units of the output layer, a selection of the nonlinear gamma curve to be used for correction can be made achieving a very rapid nonlinear gamma curve selection based on the learning results.

In the aforementioned embodiments of this invention, picture position signals and brightness signals are used as the picture information sampled by the picture signal sampling unit but, needless to say, the picture information is not limited to these signals only.

As clarified by the foregoing description, a picture processing apparatus of this invention comprises an image signal sampling unit wherein plural kinds of picture information are sampled from the image signals of one picture frame, a nonlinear gamma correction unit wherein the gamma of the image signals is corrected by nonlinear gamma curves, and a learning type gamma selector unit wherein a nonlinear relation between the picture information of the image signals sampled by the image signal sampling unit and the aforementioned gamma curve to be used for correction is established by learning and then the foregoing picture information is judged according to the results of aforementioned learning for selection of a nonlinear gamma curve to be used for correction. Since a nonlinear gamma curve to be used for correction is selected by the judgment of detailed overall picture information, a far more flexible and correct judgment is exercised at a high speed in making a gamma correction when compared with the conventional method of making a gamma correction based only on the partial picture information, excellent corrected pictures of a wide dynamic range made obtainable. Furthermore, this learning type gamma selector unit comprises a combination of a multiple number of a recognition unit comprising a signal inputting unit wherein the picture information of image signals is inputted, a quantizer wherein image signals are quantized according to the input signals from the signal inputting unit, a single or multiple number of channel input terminal and output terminal, and a channel selector unit wherein channels are selected according to the output of the aforementioned quantitizer, to form a single or multiple number of tree branch structure which comprises plural layers and forms networks. Thus, a reliable picture processing is made possible by a simpler setup.

What is claimed is:

1. An image processing apparatus for performing nonlinear gamma corrections to a plurality of image signals for a single picture frame, comprising:
   image signal sampling means for sampling the plurality of image signals of said single picture frame and producing a sampling means output corresponding to the sampled image signals,
   learning type gamma selector means, coupled to said image signal sampling means, for:
      a) establishing, in advance, a nonlinear relation between sampling means outputs under various conditions and a plurality of nonlinear gamma curves;
      b) judging said sampling means output according to said established nonlinear relation; and
      c) selecting one of the plurality of nonlinear gamma curves for correction; and
   nonlinear gamma correction means, coupled to said learning type gamma selector means, for correcting said plurality of image signals using the selected nonlinear gamma curve.

2. An image processing apparatus according to claim 1, wherein the learning type gamma selector means comprises:
   a plurality of first and second recognition units interlinked to form a network having a plurality of tree-branch structures, each of said plurality of tree-branch structures having a plurality of layers wherein one of said plurality of layers is designated as a front layer, wherein said plurality of second recognition units are situated on the front layer,
   each of said plurality of first recognition units comprising:
      a signal inputting unit for receiving said sampling means output,
      a quantizer, coupled to said signal inputting unit, for receiving and quantizing said image signals received by said signal inputting unit,
      a channel selector unit, coupled to said quantizer and having at least one channel input terminal and at least one channel output terminal, wherein channels are selected according to the output of said quantizer,
   wherein each of said plurality of second recognition units comprises
      at least one channel input terminal,
      at least one channel output terminal linked to said at least one channel input terminal, wherein said linkage has a varying strength, and
      a channel learning unit, for receiving a teaching signal and, according to said teaching signal, modifying the linkage strength between said at least one channel input terminal and the at least one channel output terminal.

3. An image processing apparatus according to claim 1, wherein said image signal sampling means comprises
   a picture splitting unit for splitting said plurality of image signals into a plurality of picture blocks and
   a characteristic signal sampling unit for sampling said plurality of picture blocks and producing an output corresponding thereto.

4. An image processing apparatus according to claim 3, wherein said characteristic signal sampling unit comprises a brightness sampling unit for sampling brightness signals from said picture blocks, each one of said plurality of picture blocks having a maximum, a medium and a minimum brightness value; and a brightness computation unit for computing the maximum, the medium and the minimum brightness values within each of said picture blocks.

5. An image processing apparatus according to claim 4, wherein said brightness sampling unit comprises a brightness signal converting means for composing brightness signals from the image signals.

6. An image processing apparatus according to claim 3, wherein said established nonlinear relation is between said characteristic signal sampling unit output and said plurality of nonlinear gamma curves.

7. An image processing apparatus according to claim 1, wherein said image signal sampling means comprises:
histogram computation processing means for
   a) inputting and processing the image signals of one picture frame, and
   b) obtaining and outputting a respective frequency for each of a plurality of signal levels for the processed image signals.

8. An image processing apparatus according to claim 7, wherein said histogram computation processing means comprises plural signal level comparators, each of said comparators for comparing the levels of picture information with a level having a certain spread in its value and outputting a comparison result with a digit number of 1 or 0, and plural counters for counting the output of said signal level comparators.

9. An image processing apparatus according to claim 7, wherein said histogram computation processing means comprises a brightness sampling unit for sampling brightness signals, plural signal level comparators, each of said comparators for comparing the brightness signals sampled through said brightness sampling unit with a level having a certain spread in its value and outputting a comparison result with a digit number of 1 or 0, and plural counters for counting the output of said signal level comparators.

10. An image processing apparatus according to claim 9, wherein said brightness sampling unit comprises a brightness signal converting means for composing brightness signals from the image signals.

11. An image processing apparatus according to claim 7, wherein said established nonlinear relation is between said histogram computation processing means output and said plurality of nonlinear gamma curves.

12. An image processing apparatus according to claim 1, wherein the nonlinear gamma correction of image signals is performed by a sigmoid curve to show nonlinearity.

13. An image processing apparatus according to claim 2, wherein the learning type gamma selector means further comprises
a plurality of third recognition units,
wherein each of the plurality of tree branch structures corresponds to one of a plurality of split picture blocks,
wherein said network has five layers and said plurality of third recognition units are situated on the fifth layer and said plurality of second recognition units are situated on the fourth layer,
each of said third recognition units comprises
   a summation computing unit for obtaining a total sum of input signals and
   a threshold processing unit for threshold processing said total sum of input signals and outputting results,
each of said plurality of third recognition units is interlinked with each of the plurality of second recognition units,
a plurality of groups of three brightness values are output by the image signal sampling means, said three brightness values corresponding to maximum, medium and minimum levels of brightness, respectively, wherein the number of groups of brightness values corresponds to the number of tree branch structures, wherein said plurality of groups of brightness values are inputted respectively to the signal inputting unit of said plurality of first recognition units situated on the first, the second and the third layers of the plurality of tree branch structures, and
the selected non linear gamma curve to be used for correction is inputted as the teaching signal.

14. An image processing apparatus according to claim 2, wherein the learning type gamma selector means further comprises
a plurality of third recognition units,
each of the plurality of third recognition units is interlinked with each of the plurality of second recognition units,
each of the plurality of tree branch structures corresponds to each of a plurality of image signal levels,
each of the plurality of third recognition units comprises
a summation computing unit for obtaining a total sum of input signals and
a threshold processing unit for threshold processing the total sum of input signals and outputting results,
respective frequencies for each of the plurality of image signal levels are output by the image signal sampling means, said respective frequencies are inputted to the signal inputting units of the first recognition units situated in the tree branch structures corresponding to each respective image signal level, and
the selected nonlinear gamma curve to be used for correction is inputted as the teaching signal.

15. A method of image processing for performing nonlinear gamma corrections to a plurality of image signals for a single picture frame, comprising the steps of:
sampling the plurality of image signals of said single picture frame and producing a sampling output signal corresponding to the sampled image signals;
establishing, in advance, a nonlinear relation between the sampling output signal under various conditions and a plurality of nonlinear gamma curves;
judging said sampling output signal according to said established nonlinear relation;
selecting one of the plurality of nonlinear gamma curves for correction; and
correcting said plurality of image signals using the selected nonlinear gamma curve.

* * * * *